(12) United States Patent
Nir (10) Patent No.: US 8,361,325 B2
(45) Date of Patent: Jan. 29, 2013

(54) METHOD AND SYSTEM FOR REMOVAL OF INORGANIC ANIONIC POLLUTANTS FROM CONTAMINATED WATER

(75) Inventor: Shlomo Nir, Mazkeret Batya (IL)

(73) Assignee: EN Gibton Ltd., Ashkelon (IL)

( * ) Notice: Subject to any disclaimer, the term of this patent is extended or adjusted under 35 U.S.C. 154(b) by 518 days.

(21) Appl. No.: 12/600,356

(22) PCT Filed: May 14, 2008

(86) PCT No.: PCT/IL2008/000664
§ 371 (c)(1),
(2), (4) Date: May 10, 2010

(87) PCT Pub. No.: WO2008/139474
PCT Pub. Date: Nov. 20, 2008

(65) Prior Publication Data
US 2010/0213135 A1    Aug. 26, 2010

Related U.S. Application Data

(60) Provisional application No. 60/917,766, filed on May 14, 2007.

(51) Int. Cl.
*C02F 1/42* (2006.01)
(52) U.S. Cl. ........................ 210/684; 210/265
(58) Field of Classification Search ................. 210/684, 210/265
See application file for complete search history.

(56) References Cited

FOREIGN PATENT DOCUMENTS
| | | |
|---|---|---|
| JP | A-2006-320821 | 11/2006 |
| RU | 2 079 434 C1 | 5/1997 |
| WO | WO 2006/077583 A1 | 7/2006 |

OTHER PUBLICATIONS

A. D. Carter, "Herbicide movement in soils: principles, pathways and processes" Weed Research, 2000, vol. 40, pp. 113-122.
W. E. Motzer, "Perchlorate: Problems, Detection, and Solutions" Environmental Forensics, 2001, vol. 2, pp. 301-311.
E. Urbansky, "Perchlorate as an Environmental Contaminant" Environ Sci & Pollut Res, 2002, vol. 9, pp. 187-192.
G. Lagaly, "Surface and Interlayer Reactions: Bentonites as Adsorbents" Proceedings of the 10$^{th}$ Int'l Clay Conference, 1995, pp. 137-143.
S. Xu et al., "Use of Organoclays in Pollution Abatement" Advances in Agronomy, 1997, vol. 59, pp. 25-62.
Y. G. Mishael et al., "Sulfometuron Incorporation in Cationic Micelles Adsorbed on Montmorillonite" Journal of Agricultural and Food Chemistry, 2002, vol. 50, pp. 2856-2863.
T. Polubesova et al., "Water Purification from Organic Pollutants by Optimized Micelle-Clay Systems" Environmental Science & Technology, 2005, vol. 39, No. 7, pp. 2343-2348.
D. Zadaka et al., "Determination of release of organic cations from micelle-clay complexes and their re-adsorption in sand/clay columns" Applied Clay Science, 2005, vol. 29, pp. 282-286. B. S. Krishna et al., Thermodynamics of Chromium (VI) Anionic Species Sorption onto Surfactant-Modified Montmorillonite Clay, Journal of Colloid and Interface Science, 2000, vol. 229, pp. 230-236.
Oct. 9, 2008 International Search Report issued in International Patent Application No. PCT/IL2008/000664.

*Primary Examiner* — Chester Barry
(74) *Attorney, Agent, or Firm* — Oliff & Berridge, PLC (57) ABSTRACT

There is provided a method or a system for obtaining an aqueous solution substantially free of inorganic anionic pollutants selected from perchlorate, cyanide or chromate present therein, comprising contacting the aqueous solution containing said pollutants with a complex comprising micelles of an organic cation adsorbed on clay for removal of said pollutants from the aqueous solution. The method and system may also utilize a mixture of a complex of an organic cation adsorbed on clay as a micelle, and a granular material or a complex of an organic cation adsorbed on clay as a micelle. There is also provided a system comprised of a column accommodating the mixture of a complex of an organic cation adsorbed on clay as a micelle, and a granular material.

11 Claims, 2 Drawing Sheets

BDMHDA

Benzyldimethylhexadecylammonium (BSMHDA)

FIG. 1A

OCTADECYLTRIMETHYLAMMONIUM

(ODTMA) CMC=0.3mM

FIG. 1B

1-Hexadecylpyridinium bromide (Cetylpyridinium bromide)

METHOD AND SYSTEM FOR REMOVAL OF INORGANIC ANIONIC POLLUTANTS FROM CONTAMINATED WATER

FIELD OF THE INVENTION

This invention relates to a method and system for removal of inorganic anionic pollutants from water.

BACKGROUND OF THE INVENTION

In the text below reference is made to the following prior art documents:
(1) Carter, A. D. *Weed Res.*, 2000, 40, 113-122.
(2) Motzer, W. E. Environmental Forensics 2001, 2, 301-311.
(3) Urbansky, E. T. Environ. Sci. & Pollut. Res., 2002, 9, 187-192.
(4) Lagaly, G. In: Proc. of the 10th International Clay ConferencSurface and interlayer reactions. Churchman, G. J., Fitzpatrick, R. W. & Egglegton, R. A. Eds.; CSIRO Pub.: Melbourne, Australia, 1995; pp. 137-144.
(5) Xu, S.; Sheng, G.; Boyd, S. A. *Adv. Agron.* 1997, 59, 25-62.
(6) Mishael, Y. G.; Undabeytia, T.; Rytwo, G.; Papahadjopoulos-Sternberg, B. Rubin, B.; Nir, S. *J. Agric. Food Chem.* 2002, 50, 2856-2863.
(7) Polubesova, T.; Nir, S.; Zadaka, D.; Rabinovitz, O.; Serban, C.; Groisman, L.; Rubin, B. *Environ. Sci. Technol.* 2005, 39, 2343-2348.
(8) Zadaka, D.; Polubesova, T.; Mishael, Y.; Spitzy, A.; Koehler, H.; Wakshal, E.; Rabinovitz, O.; Nir, S. *Appl. Clay Sci.* 2005, 29, 282-286.
(9) WO 2006/077583

These prior art documents are relevant for understanding the state of the art in the field of the invention. The references will be referred to in the text by giving their serial number from said list.

Pollution of groundwater and wells has become an environmental and economical hazard due to intensively irrigated agriculture and application of herbicides and pesticides over cultivated lands as well as waste spills within the catchment areas of the various hydrogeological basins (1).

Perchlorate anion ($ClO_4^-$), which is quite inert, is produced when salts of ammonium, or sodium perchlorate dissolve in water. One source of perchlorate in water arises from waste water of plants of solid rocket engine fuels. Another source is due to the use of certain fertilizers. At relatively large concentrations, perchlorate interferes with the body's iodine intake, causing disruption of thyroid gland functions (2, 3), although a safe daily exposure has not yet been agreed upon. Upper limits on perchlorate concentrations in drinking water in several states in USA vary between a few ppb and about twenty ppb. In Israel no official limit has been set, but many wells have been closed when perchlorate concentrations exceeded 24 ppb. Regions in the aquifer with perchlorate concentrations at 1000-fold higher than the above limit have been identified.

Chromium is a major pollutant arising from erosion of natural deposits, discharge from steel and metal refining industries, pulp mills, and a variety of manufacturing industries. Chromium is a known carcinogen, and hexavalent chromium as in chromate is mutagenic. In its hexavalent form chromium can be taken up by cells. Its allowed concentration in the hexavalent form is about 10 ppb.

Cyanides are compounds which contain the CN group. The major sources of cyanide released to water are metal finishing industries, iron and steel making industries and water treatment facilities. The most important metal-cyanide complexes are those of iron, zinc, nickel, copper cobalt and cadmium. Iron cyanocomplexes most commonly occur in various effluents (electropolating, gold mining, coal gasification), which photodissociate to free cyanide upon exposure to sunlight, which enhances significantly their toxicity. The upper limits on cyanide concentrations in drinking water vary between 50 and 200 ppb.

The adsorption of organic cations on clays partially transforms the clay-mineral surface from hydrophilic to hydrophobic (4, 5). The micelle-clay system is a relatively new innovation in which the structure includes a positively charged surface to a varying degree and a hydrophobic core (6,7).

SUMMARY OF THE INVENTION

The present invention is based on the finding that a combination of a granular material with a complex of micelles of an organic cation adsorbed on clay can efficiently and selectively adsorb certain inorganic anionic pollutants dissolved in contaminated water. The granular material is typically in excess to said complex.

In the following, numerical values that are given should be understood as being approximations and represent a value with the range of 70% to 130% of the one indicated. Thus, for example, "0.2 mm" refers in fact to 0.14-0.26 mm.

Thus the present invention is directed to a method for obtaining an aqueous solution substantially free of inorganic anionic pollutants selected from perchlorate, cyanide or chromate present therein, comprising contacting the aqueous solution containing said pollutants with a complex comprising micelles of an organic cation adsorbed on clay for removal of said pollutants from the aqueous solution.

In accordance with the present invention the method may comprise contacting the aqueous solution containing the above-mentioned pollutants with a mixture comprised of (i) a granular material and (ii) the complex comprising micelles of an organic cation adsorbed on clay.

According to one embodiment, the ratio (w/w) between the granular material and said complex being in the range of about 5:1 to about 200:1, preferably about 10:1 to about 100:1 and most preferably about 10:1 to about 19:1.

The term "water" as used herein encompasses aqueous solutions. The aqueous solutions or "water" may be: water contaminated by industrial or domestic waste; affluent water; contaminated aqueous food products or raw material, e.g. contaminated milk, residual aqueous solution obtained after processing food, etc.

The term "water", other than if accompanied by a descriptor thereof, will be used to refer to the contaminants/pollutants-containing water. The term "purified water" will be used to denote water that has been purified by the inventive method or system.

The term "present" in the context of the invention refers to any manner in which pollutants or contaminants may appear in a liquid medium and includes solution, suspension, emulsion and presence as colloidal particles In the description herein the terms "pollutants" and "contaminants" will be used interchangeably.

The term (w/w) means a ratio between the weight of one substance to that of another. Thus, a ratio (w/w) between the granular material and said complex of about 5:1 means that there are 5 weight units of the granular material for each 1 weight unit of said complex.

Said contacting may be in a continuous flow process in which the water is flown through or over said mixture. For that purpose at least one container containing said mixture is used. Said container may be a column containing said mixture through which the water is flown at a rate such as to permit the contaminants to be removed therefrom. Alternatively, contacting may be done in a pool, tank or reservoir into which the water is continuously introduced and continuously removed at a rate such that the mean residence time of the water in the container is sufficient for the contaminants to be removed therefrom. In such a case there is no need to use the mixture and it is sufficient to use only the complex comprising micelles of an organic cation adsorbed on clay.

Alternatively said contacting may be done in a batch-type procedure in which, for example, the polluted water is introduced into a container containing said complex comprising micelles of an organic cation adsorbed on clay and incubated in said container for a time period sufficient for absorption of the pollutants from the water, whereupon it is removed. Such incubation may be with or without stirring or agitating the suspension of the water with said mixture.

In addition, it is possible also to introduce said complex comprising micelles of an organic cation adsorbed on clay into reservoirs containing said water for an in situ purification by the presence of the complex in the reservoir for a sufficient time for purification of the polluted water.

Generally, the invention is not limited to the physical manner in which the method is performed.

The ratio of the organic cation and the clay is typically about 0.3:1 to about 0.7:1 (w/w), preferably about 0.4:1 to about 0.6:1, most preferably about 0.44:1 to about 0.5:1.

As noted above, a typical example of a container is a column accommodating said mixture. By one embodiment the column is entirely filled with said mixture. In accordance with another embodiment, the column is partially filled with said mixture while other portions, typically at the column's bottom may be filled with another material or different mixture. For example, one end of the column consisting about 7-10% of the column's length comprises either the granular material or a mixture of granular material with clay. It is also possible to prepare a column having alternate first and second types of layers, wherein the first layers contain said mixture and the second layers another material or different mixtures. A plurality of columns may be employed, which may be all the same or may be different.

The term "granular material" refers in particular to a material which is chemically inert, and which may be homogenous, or may be heterogeneous in size, chemical composition or structure.

The granular material is preferably composed of particles having an average particle size from about 0.2 mm to about 2 mm. One preferred granular material is sand. Sand is any natural material resulting from disintegrated rocks, top soil or coastal soil, typically quartz-based sand. Other preferred granular materials are anthracite and ground basalt rock.

The clay may be any aggregate of hydrous silicate particles less than 4 μm in diameter consisting of a variety of phyllosilicate minerals rich in silicon, aluminium oxides and hydroxides which include variable amounts of structural water. The clay may be chosen from sepiolite, illite, and smectite, preferably it is chosen from a smectite, most preferably the clay is montmorillonite $[(Na,Ca)_{0.33}(Al,Mg)_2Si_4O_{10}(OH)_2 \cdot nH_2O]$.

The organic cation is a cation having amphipathic properties, which is capable of foaming micelles in an aqueous medium. The tendency of the organic cation to form micelles in an aqueous medium can be enhanced by increasing the concentration of salts in the medium. The micelles are essentially spherical structures wherein the hydrophobic (organic) part of the organic cation is in its interior and the ionic part faces the aqueous medium. The micelles adsorbed on the clay may comprise each several different organic cations, or the clay may have adsorbed thereon different types of micelles, each of which has a different composition of organic cations.

Examples of preferred salts of organic cations are: a salt of ammonium cation of the type $X^+Y^-$ wherein $X^+$ is an $R''$—N$(R')_3$, $R'$ being each independently a $C_{1-4}$alkyl group, an optionally substituted phenyl or an alkylphenyl group; $R''$ is $C_{12}$-$C_{20}$-alkyl preferably $C_{14}$-$C_{20}$-alkyl, most preferably $C_{16}$-$C_{20}$-alkyl and Y is a counter ion chosen from $Cl^-$, $Br^-$ or $OH^-$. Preferably, R' is methyl, ethyl, propyl, pheny, benzyl and $R''$ is $C_{14}H_{29}$, $C_{15}H_{31}$, $C_{16}H_{33}$, $C_{16}H_{31}$, $C_{17}H_{35}$, $C_{17}H_{33}$, $C_{18}H_{37}$, $C_{18}H_{35}$, $C_{19}H_{39}$ $C_{19}H_{37}$, $C_{20}H_{41}$, $C_{20}H_{39}$. The ammonium cation is characterized as having a low critical micelle concentration (CMC) of less than 1 mM. Consequently, in the complex of an organic cation adsorbed on clay, the organic cation is adsorbed as a micelle.

The pollutants which may be removed from water according to the invention are anionic inorganic pollutants, such as perchlorate (monovalent), chromate (divalent), and cyanide (one to trivalent).

The present invention is further directed to a system for carrying out the methods described above. The system according to a preferred embodiment, intended for purifying water from certain anionic inorganic pollutants selected from perchlorate, cyanide or chromate dissolved therein, the system comprises at least one container adapted to receive the polluted water and containing a mixture of (i) a granular material and (ii) a complex comprising micelles of an organic cation adsorbed on clay.

In accordance with the invention it is possible also to purify a body of water, from anionic inorganic pollutants selected from perchlorate, cyanide or chromate dissolved therein, including, for example, open water pools or reservoirs, water contained in tanks, etc., by introducing into the water (i) the micelles of the organic cations and then introducing particulate clay, e.g. of the kind specified above, or (ii) the complex of the micelles with the clay. In the former case (that under (i)) the complexes of the micelles and the clay are formed in situ. Said complexes may then be permitted to sediment and the sediment may then be collected.

Such a method of purifying a body of water does not require the use of a granular material. The micelles of the organic cations and the particulate clay either introduced separately or as a complex into the body of water intended to be purified need only to be efficiently well distributed in the whole body of water. This can be done by stirring, agitating, producing waves within the body of water such that the micelles of the organic cations adsorbed on the particulate clay is present in the entire body of water.

Thus, the present invention also provides a method for purifying water, from anionic inorganic pollutants selected from perchlorate, cyanide or chromate dissolved therein, comprising: adding into the water (i) micelles of an organic cation and particulate clay, typically first the micelles and subsequently the particulate clay, or (ii) a complex of micelles of an organic cation adsorbed on clay. In the former case a complex between the particulate clay and the micelles is formed in situ.

By one embodiment, after the addition of the micelles followed by the addition of particulate clay or after the introduction of said complex, as the case may be, the micelles or said complex are typically incubated for a time period allowing the micelles to absorb the pollutants from the water. During such an incubation stage, the water may be stirred or agitated so as to improve the rate and/or efficiency of absorption. Where the micelles and the particulate clay are introduced separately, there may be an incubation period occurring prior to the introduction of the particulate clay.

After an incubation period the clay-micelles complex is permitted to sediment and the sediment is then collected. The sedimentation may be a free, gravity-induced sedimentation or may be a forced one, e.g. using a centrifuge.

The micelles and the clay will typically be introduced in the water in the form of an aqueous suspension. A micelle formulation, the particulate clay and a formulation comprising said complex, may originally be in a dry or lyophilized form.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

As mentioned, the present invention is directed to a method and system for purifying water from certain anionic inorganic pollutants, such as perchlorate, cyanide or chromate present therein. In a method and system for purifying polluted water by letting the polluted water pass, e.g. flow through a purifying system, use is made of a mixture of a granular material and a complex comprised of micelles of organic cation adsorbed on clay which may be contained in a container. It should be noted, however, that a special design of the container enables the flow of the polluted water through the container even without the addition of granular material. Put in other words, a special design of the container containing the complex comprised of micelles of organic cation adsorbed on clay demonstrates that it is also possible to eliminate the need of granular material, where the container may be specially designed such that the filter enables a flow without the need to have the granular material.

As already pointed out above, the invention is not limited to purification by letting the polluted water flow through a container. It is possible, for example, to introduce the complex comprising micelles of an organic cation adsorbed on clay into water reservoirs for in situ water purification, or alternatively introduce the polluted water into a container containing said complex where the polluted water are incubated for a time period sufficient for absorption of the pollutants from the water. In such cases the polluted water does not flow through a filter but are rather statically contacted with the purifying complex.

The container is preferably in the form of a column where the system may be formed of a single column or comprise two or more columns connected in series or in parallel by channels, pipes or any conduit enabling the flow (by gravity or by forced pumping) of water between them. While column is a preferred container type according to the invention, the invention is not limited thereto and other container types may be used. These include containers adapted for a batch-type purification process, such as open pools or basins, tanks, etc., with or without a water stirrer or agitator. For purification, the water is introduced and removed after a time sufficient for removal of the pollutants from the water by said mixture. These also include containers for a flow-based purification process in which the liquid is flown through or over said mixture, including columns, flow-through reservoirs or pools with inlet at one or more points and outlet at one or more other points situated such so as to ensure flow of water through or over said mixture in manner to permit removal of the contaminants from the water.

Columns may either be fully filled with said mixture or the column may comprise also layers filled with a different composition. The layer filled with a different composition may, for example, be a thin layer at one end, e.g. its bottom, the width of such layer being about 7-10% of the length of the column, said layer comprising only the granular material or a mixture of the granular material and clay (without the organic cation). It is also possible, by some embodiments of the invention, for the column to have alternate first and second types of layers, which may be of the same or different thicknesses, wherein the first layers contain said mixture and the second layers comprising of a different composition.

The micelle-clay complex: the starting point may be a concentrated solution (several mM) of organic cations which include a large hydrophobic part and consequently have a very small critical micelle concentration (CMC), such as octadecyltrimethylammonim (ODTMA) which has an alkyl chain of 18 carbon atoms, CMC=0.3 mM. The mixed micelles which carry a net positive charge adsorb on negatively-charged clay platelets, e.g., montmorillonite, forming aggregates. The micelles, which include several tens to about several hundred molecules, are in the nanometer range, whereas the clay platelets have a thickness of the order of a nanometer, and a typical area of the order of 1 $\mu m^2$.

It has been determined by some of the inventors (6) that the adsorption of hexadecyltrimethylammonium (HDTMA) and ODTMA on montmorillonite occurs above and below their CMC. At added concentrations above the CMC, the loading exceeded the clay's cation exchange capacity (CEC) and indicated higher affinity of the cation with the longer alkyl chain. An adsorption model could adequately simulate organic cation adsorption at added concentrations below the CMC, and yield fair predictions for the effect of ionic strength (6).

The model calculations and experimental results (6) indicated that above the CMC, adsorbed micelles contributed significantly to the amount of ODTMA adsorbed. Evidence for adsorption of ODTMA micelles on montmorillonite was provided by freeze-fracture electron microscopy, X-ray diffraction, and dialysis bag measurements. Electron microscopy showed a high concentration of micelles in the size range of about 7 to 17 nm. ODTMA added inside a dialysis bag to a clay suspension outside the dialysis bag gave similar features of the clay particles as observed for clay alone.

In the presence of 5 mM ODTMA and 5 g/L clay, 95% of the anionic herbicide sulfometuron (SFM) adsorbed, whereas the anionic herbicide sulfosulfuron yielded 99% adsorption (7). A very small fraction of these herbicides adsorbed when ODTMA was inside a dialysis bag and the clay was outside, despite the similarity in the adsorbed amounts of ODTMA in both cases. Thus, the complex formed between ODTMA and montmorillonite in the presence of excess of micelles is very different from the complex formed in the exclusive presence of ODTMA monomers, as shown by electron microscopy, XRD and adsorption measurements. After the addition of the micelles followed by the addition of particulate clay or after the introduction of said complex, as the case may be, the micelles or said complex are typically incubated for a time period allowing the micelles to absorb the pollutants from the water. During such an incubation stage, the water may be stirred or agitated so as to improve the rate and/or efficiency of absorption. Where the micelles and the particulate clay are introduced separately, there may be an incubation period occurring prior to the introduction of the particulate clay. Unlike the monomer-clay complex (organo-clay), the micelle-clay complex was highly efficient for the adsorption of anionic herbicides (6,7). When the loading of the organic cations exceeds the cation exchange capacity (CEC) of the clay, it becomes positively charged and potentially suitable for the adsorption of certain inorganic anions, such as perchlorate or chromate. However, a much more effective adsorption of these anions occurred by the micelle-clay complex, rather than by positively charged organo-clays.

According to the present invention the organic cation/clay complex is optimized by a selection of preferred organic cations which form an organic cation/clay complex where the organic cation is in the form of a micelle. In addition, the optimized complex is mixed with a granular material, such as sand or anthracite, yielding an efficient combination for purification of a variety of contaminants from of water.

Certain anionic inorganic pollutants, such as perchlorate and cyanide bind well to the positively charged micelles, which attract electrostatically their negatively-charged moieties. The micelles with incorporated pollutants, which carry a net positive charge, adsorb on negatively charged clay platelets, e.g., montmorillonite.

Removal of Perchlorate by a Filter
(1) Laboratory Experiments

In the experiments whose results are shown in Table 1 tap water from Rehovot (Israel) were used which include 140 ppm of chloride, 50 ppm of nitrate and 50 ppm of sulfate, i.e., the competing anions were present at concentrations more than 1000-fold larger than that of perchlorate. The passage of 1 to 70 liters (9 to 630 pore volumes) of tap water through our column filter resulted in relative minimal variations in the concentrations of these anions. After a passage of 30 liters the bromide concentration was of the same value as in tap water. In a well which was closed due to excess perchlorate (in Yashresh, near Rehovot, Israel) chloride concentration was 173 ppm, whereas nitrate and sulfate concentrations were similar to those in Rehovot. In that well the perchlorate concentration was about 700 ppb, i.e., about 30-fold larger than the set limit. In both cases of the Yashresh well and Rehovot tap water enriched by perchlorate this anion was removed selectively by our filter.

The results in Table 1 demonstrate percents of removal from an initial solution containing 54.3 ppb perchlorate. In this case removal was complete. In Table 2 the percent removal was taken in several cases as an average of 3 sets of measurements. We also present cumulative percents of removal which would correspond to a situation where the purified water is transferred to a certain reservoir, i.e. mixed. Tables 3 and 4 give experimental and calculated values for a case where the initial perchlorate concentrations were 1 and 10 ppm, respectively. The calculated values were obtained by using the parameters obtained from a simulation of the results for the case where the initial concentration of perchlorate was 100 ppb (Table 2), except for determining a lower bound on the values of $R_0$, the molar concentration of adsorbing sites (Eq (1), vide infra) from the results of perchlorate removal from a solution at an initial concentration of 10 ppm. Hence the calculated values in Tables 3 and 4 are in fact predictions. These fair predictions, demonstrate the usefulness of accompanying the experiments by calculations. The agreement is in particular good for the cumulative percents of removal. It is evident that an increase in perchlorate concentration by a factor of ten results in a 3-fold decrease in the volumes which can be purified and in increased absolute amounts of perchlorate removed.

The filtration experiments in Tables 1-6 were carried out for a 100:1 (w:w) mixture of sand with the micelle-clay complex at a flow rate of 20 mL/min, which corresponds to a velocity of 1 cm/min, or 0.6 m/h, or 14.4 m/d. The program and experimental results indicate that the capacity is proportional to the amount of adsorbing complex in the filter, and that by increasing its concentration 10-fold the flow rate and velocity can be proportionately increased, e.g., to 6 m/h or 144 m/d. Tests with a mixture of the micelle (ODTMA)-clay complex with sand and basalt rock in excess (about 20:20:1) yielded higher flow rates corresponding to 24 m/h.

Table 5 shows the results of filtration of water from a well in Yashresh, where initial perchlorate concentration was 714 ppb. In another experiment with water from this well we employed two filters in series and performed measurements of the water emerging from each filter (Table 6). The cumulative perchlorate concentration refers to the water emerging from the second filter. Tables 5 and 6 show again that the predicted values agree fairly well with the experimental values. The main purpose of the experiment in Table 6 was to demonstrate the advantage of using a combination of two filters in series, which enables to utilize better the first filter from which at the 34$^{th}$ liter the emerging concentration of perchlorate is 37.8 ppb, i.e., beyond the limit of 24 ppb. By such a combination the captured amount of perchlorate per filter increases.

Removal of Perchlorate by a Filter
(2) Large Scale Filtration at a Well

The cylindrical filter employed included an active layer (110*60 cm) composed of a mixture of the micelle (ODTMA)-clay complex with sand at a 1:19 (W/W) ratio. The weights of the complex and ODTMA in the filter were 23 and 7 kilograms, respectively. The water was pumped from the well to a container (10 m$^3$) from which the water was fed to the filter at a given flow rate. A small filter whose purpose was to remove solids which were in the water mainly because a collapse of an old pump immersed in the water (which did not affect perchlorate concentration) preceded the pilot filter. The filter operated for almost 3 months starting on Aug. 22, 2007 at flow rates between 3 m$^3$/h and 0.5 m$^3$/h, where the higher flow rate corresponds to a velocity of 10.62 m/h.

Figure 2:
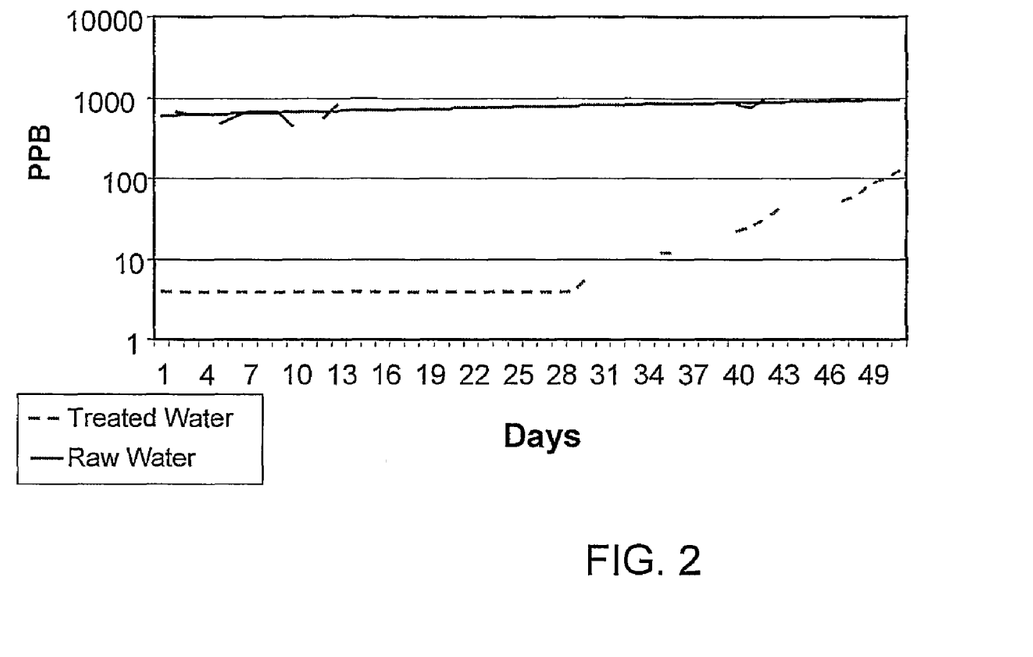
FIG. 2 shows the outcome of a large scale experiment for removal of perchlorate from a closed well in situ.

The results are presented in Table 7 and FIG. 2. The detection limit of the ion chromatograph (Dionex; measurements performed by the Israeli Water Authority Laboratory) was between 2-4 ppb. Hence, perchlorate concentrations below the detection limit were denoted in Table 7 and FIG. 2 by <4 ppb. The results indicate that perchlorate concentrations in the pumped water increased from 600 ppb in the first 100 m$^3$ to average values of 850 ppb with peak values of 980 ppb. Up to the first 180 m$^3$ the filtered water included perchlorate below the detection limit, whereas the set limit (24 ppb) was obtained after 231 m$^3$.

The last column in Table 7 gives calculated concentrations of perchlorate in the water emerging from the filter by assuming initial perchlorate concentration of 850 ppb and an average flow rate of 0.8 m$^3$/h. In parenthesis are calculated values which assumed an average concentration of 800 ppb in the pumped water. The calculated values are actually predictions, since the same parameters were used as in Tables 2-6. As noted before the calculations also indicate that using a reservoir for the filtered water can increase the capacity of the filter by 20%.

It is estimated that less than one kg of ODTMA is required for purifying 50 and 46 m$^3$ of water including initially 100 ppb of perchlorate for a flow rate corresponding to velocities of 4 and 10 m/h, respectively. For purifying water with 850 ppb perchlorate (as in the well in Yashresh) the corresponding capacity values are 32 and 23 $m^3$ per kg of ODTMA, whereas for industrial wastes which include 10 ppm the corresponding capacities are 12 and 9 $m^3$ per kg of ODTMA. The relative advantage of the micelle (ODTMA)-clay may be even larger when dealing with larger perchlorate concentrations, which have been observed in parts of the Aquifer and exist in certain industrial wastes.

Other results obtained during the experiments were that the pH values of the filtered water were not affected and varied between 7.5 and 8.14, and no changes were detected in conductance values. Turbidity was reduced by the filter from 0.24 to 0.15 NTU during the $6^{th}$ week and from 5.1 to 0.11 during the first week. The filter reduced the number of pathogenic bacteria from 14 per 100 mL to zero and also reduced 20-fold total count of bacteria. (for measurements carried out during $6^{th}$ week). These results are in line with earlier measurements of filtration by our laboratory filters and in suspension, which demonstrated efficient removal of bacteria and cryptosporidium by the micelle-clay complex.

TABLE 1

Removal of perchlorate from an initial solution of 54.3 ppb by a filter, which included a micelle-clay complex and excess sand (100:1, w/w)[a].

| Successive volumes of perchlorate solution passing through the filter (liter) | Concentration in emerging solution (ppb) | Experimental Percent removal |
|---|---|---|
| 30 | 0 | 100 |
| 60 | 0 | 100 |
| 69 | 0 | 100 |
| 87 | 0 | 100 |
| 96 | 0 | 100 |

[a]The filter included 6.5 gr of complex, which amounts to 2 gr of ODTMA. The flow rate was 20 ml/min.

TABLE 2

Removal of perchlorate from an initial solution of 100 ppb by filter, which included a micelle-clay complex and excess sand (100:1, w/w)[a].

| Successive volumes of perchlorate solution passing through the filter (liter) | Concentration in emerging solution (ppb) | Experimental Percent Removal (average) | Calculated Percent removal | Exper. Cumulative Percent removal | Calc. Cumulative Percent removal |
|---|---|---|---|---|---|
| 30 | 0 | 98.1 | 98.5 | 99.2 | 99.7 |
|  | 5.8 |  |  |  |  |
|  | 0 |  |  |  |  |
| 61 | 5.7 | 82.5 | 82.2 | 94.7 | 96.1 |
|  | 27.1 |  |  |  |  |
|  | 19.8 |  |  |  |  |
| 69 | 34.4 | 65.6 | 66. | 92.4 | 93. |
| 87 | 48.7 | 51.3 | 50. | 85.4 | 84. |
| 96 | 55.6 | 44.4 | 42. | 82 | 80. |
| 114 | 67.9 | 32.1 | 28. | 75.1 | 73.5 |

[a]The calculations according to Eq (1) (vide infra) employed the following values of parameters: $R_0 = 0.0266$ $M^{-1}$; $C_1 = 60$ mL/min$^{-1}$; $D_1 = 0.0018$ min$^{-1}$. The filter included 6.5 gr of complex, which amounts to 2 gr of ODTMA. The flow rate was 20 ml/min.

TABLE 3

Removal of perchlorate from an initial solution of 1 ppm by a filter, which included a micelle-clay complex and excess sand (100:1, w/w)[a].

| Successive volumes of perchlorate solution passing through the filter (liter) | Concentration in emerging solution (ppb)* | Experimental Percent Removal (average) | Calculated Percent removal | Experimental Cumulative Percent removal | Calculated Cumulative Percent removal |
|---|---|---|---|---|---|
| 6 | 0 | 100 | 100 | 100 | 100 |
| 12 | 0 | 100 | 99.2 | 100 | 99.7 |
| 15 | 0 | 100 | 98.7 | 100 | 99.6 |
| 21 | 0 | 100 | 98.2 | 100 | 99.2 |
| 27 | 7.4 | 91.6 | 94.9 | 97.4 | 98.5 |
| 30 | 8.7 | 90.2 | 93.4 | 96.8 | 98.2 |

*The initial solution concentration after 10-fold dilution was 88.6 ppb. The results of perchlorate concentration in the solution are after 10-fold dilution. Percent removal was related to initial perchlorate concentration of 88.6 ppb.
[a]The calculations according to Eq (1) employed the same values of parameters as in Table 2. The flow rate was 20 ml/min.

TABLE 4

Removal of perchlorate from an initial solution of 10 ppm by a filter, which included a micelle-clay complex and excess sand (100:1, w/w)[a].

| Successive volumes of perchlorate solution passing through the filter (liter) | Concentration in emerging solution (ppb)* | Experimental Percent removal (average) | Calculated Percent removal | Experimental Cumulative Percent removal | Calculated Cumulative Percent removal |
|---|---|---|---|---|---|
| 1.2 | 0 | 100 | 100 | 100 | 100 |
| 3.6 | 0 | 100 | 99.8 | 100 | 99.9 |
| 4.8 | 0 | 100 | 99.7 | 100 | 99.9 |
| 6 | 0 | 100 | 99.5 | 100 | 99.8 |
| 7.2 | 0 | 100 | 99.3 | 100 | 99.7 |
| 8.4 | 6 | 92.8 | 98.9 | 99.4 | 99.7 |
| 10.2 | 0 | 100 | 98.3 | 99.6 | 99.5 |
| 13.8 | 0 | 100 | 94.7 | 99.8 | 99. |

*The initial solution concentration after 100-fold dilution was 83.5 ppb. The results of perchlorate concentration in the solution are after 100-fold dilution. Percent removal was related to an initial concentration of 83.5 ppb.
[a]The calculations according to Eq (1) (vide infra) employed the same values of parameters as in Table 2. The flow rate was 20 ml/min.

TABLE 5

Removal of perchlorate from water taken from Yashresh well, which included 714 ppb perchlorate by a filter which included a micelle-clay complex and excess sand (100:1, w/w)[a]

| Successive volumes of water passing through the filter (liter) | Concentration in emerging solution (ppb)* | Experimental Percent Removal (average) | Calculated Percent removal | Exper. Cumulative Percent removal | Calculated Cumulative Percent removal |
|---|---|---|---|---|---|
| 8 | 0 | 100 | 100 | 100 | 100 |
| 30 | 25.6 | 96.3 | 94.1 | 98.6 | 98.2 |
| 42 | 70.4 | 90 | 86.3 | 97 | 96.1 |
| 60 | 189.2 | 72.9 | 68.4 | 92.4 | 90.8 |
| 82 | 280.8 | 59.8 | 42.4 | 86.6 | 81.5 |

*The initial concentration after 4-fold dilution was 174.5 ppb. The actual values measured were 4-fold smaller than shown in the Table. The concentration of perchlorate in Yashresh well on that day was 698 ppb. Another measurement (after 7-fold dilution) was 714 ppb of perchlorate (see Table 6). Percent removal was related to an initial concentration of 698 ppb. The calculations according to Eq (1) (vide infra) employed the same values of parameters as in Table 2. The flow rate was 20 ml/min.

TABLE 6

Removal of perchlorate from water pumped from Yashresh well which included 714 ppb by each of two filters in series.[a]

| Successive volumes of perchlorate solution passing through the filter (liter) | Experimental Percent removal | Calculated Percent removal | Exper. Cumulative Percent removal | Calculated Cumulative Percent removal |
|---|---|---|---|---|
| 10.2 | 100 (100) | 100 (100) | 100 | 100 |
| 28 | 100 (97) | 100 (95.) | 100 | 100 |
| 34 | 100 (94.7) | 100 (91.8) | 100 | 99.99 |
| 38 | 100 (80.6) | 100 (89.2) | 100 | 99.98 |
| 57 | 96 (73) | 99.1 (71.6) | 99.3 | 99.9 |
| 92 | 95.7 (43.9) | 93.5 (31.1) | 97.6 | 98.9 |

[a]Each filter included a 20 cm layer of a micelle-clay complex and excess sand (100:1, w/w). The calculations according to Eq(1) (vide infra) employed the same values of parameters as in Table 2 and the flow rate was also the same, 20 mL/min. Values in parenthesis pertain to the first filter.

TABLE 7

Summary of a pilot experiment for perchlorate removal from water from a closed well in Yashresh[a]

| cumulative volume passed (M³) | flow rate (M³/h) | perchlorate Conc. in the water at entry to filter | perchlorate Conc. (ppb) in water emerging from filter | calculated emerging perchlorate Conc. |
|---|---|---|---|---|
| 6 | 3 | 564.6 | <4 | 0 |
| 30.9 | 3 | 582.6 | <4 | 0 |
| 38.5 | 3 | 643.5 | <4 | 0 |
| 48 | 2 | 630 | <4 | 0 |
| 57.1 | 2 | 601 | <4 | 0 |
| 70.4 | 1 | 648 | <4 | 0 |
| 80.5 | 1 | 613 | <4 | 0 |
| 94.6 | 1 | 616, 647, 660 | <4 | 0 |
| 96.3 | 1 | 625.1 | <4 | 0 |
| 106 | 1 | | <4 | 0 |
| 108 | 1 | 602.7, 575.7 | <4 | 0 |
| 113.2 | 0.5 | 615.9, 637.7 | <4 | 0 |
| 114.9 | 0.5 | 659.3, 675.4 | <4 | 0 |
| 117.9 | 0.5 | 673.4 | <4 | 0 |
| 120 | 0.5 | 776 | <4 | 0 |
| 129.6 | 0.5 | 698.4 | <4 | 0 |

TABLE 7-continued

Summary of a pilot experiment for perchlorate removal from water from a closed well in Yashresh[a]

| cumulative volume passed ($M^3$) | flow rate ($M^3/h$) | perchlorate Conc. in the water at entry to filter | perchlorate Conc. (ppb) in water emerging from filter | calculated emerging perchlorate Conc. |
|---|---|---|---|---|
| 140 | 0.5 | 729.9 | <4 | 0 |
| 142 | 0.5 |  | <4 | 0 |
| 147.7 | 0.5 | 766 | <4 | 0 |
| 152 | 0.5 |  | <4 | 0 |
| 164 | 0.5 | 858 | <4 | 0.3 |
| 171.2 | 0.5 |  | <4 | 0.5 |
| 178.8 | 0.5 |  | <4 | 0.8 |
| 182.2 | 0.5 |  | 4 | 1 |
| 189.6 | 0.5 |  | 6 | 2 (1.6) |
| 211 | 0.5 |  | 12 | 10 (6) |
| 211.7 | 0.5 |  | 12 | 10 (7) |
| 220 | 0.5 | 787 | 16 | 14 (10) |
| 231 | 0.5 | 806 | 22 | 23 (19) |
| 235 | 0.5 | 832 | 25 | 30 (25) |
| 239.5 | 0.5 | 911 | 32 | 32 (27) |
| 244.5 | 0.5 | 898 | 44 | 44 (42) |
| 252 | 0.5 | 763 | 46 | 58 (48) |
| 260.4 | 0.5 | 763 | 53 | 82 (67) |
| 266 | 0.5 |  | 62 | 90 (89) |
| 270.5 | 0.5 | 820 | 86 | 110 (102) |
| 273.5 | 0.5 |  | 101 | 118 (117) |
| 278.7 |  |  | 124 | 140 (140) |

[a]The cylindrical filter included an active layer (110 * 60 cm) composed of a mixture of the micelle(ODTMA)-clay complex with sand at a 1:19 (W/W) ratio.

Removal of Chromate and Cyanide

Chromate: ODTMA micelles (6 mM) removed by sedimentation 90% of chromate from a solution of 11.6 ppm of chromate in tap water. (Measurements by spectrophotometer). Passing a similar chromate solution through a filter which included BDMHDA-montmorillonite complex mixed with excess sand (50:1, w/w) removed completely chromate from the first 10 pore volumes, whereas between 10 and 15 pore volumes percent removal decreased approximately linearly from 100% removal to 50% removal with passing solution volumes.

Cyanide. Table 8 gives results of cyanide removal from water by filtering a solution of $(Fe(CN)_6)^{3-}$ through our laboratory column (as in Table 1). In this experiment the concentration of Fe was 0.926 ppm (as measured by ICP) and the concentration of the cyanide was 2.9 ppm. The results in the Table indicate agreement between the measured concentration of Fe and that of the cyanide in the emerging water. In another experiment the passage of 300 L of $(Fe(CN)_6)^{3-}$ at a flow rate of 50 mL/min and initial Fe concentration of 40 ppb, i.e., (cyanide concentration was 0.11 ppm and total $(Fe(CN)_6)^{3-}$) concentration was 0.15 ppm) the percent removal was between 95% and 89.8%, which implies that the complex has a large capacity for cyanide removal in this range, at least 150 $m^3$ per 1 kg of ODTMA.

TABLE 8

Removal of Ferric-cyanide complex, $(Fe(CN)_6)^{3-}$ from an initial solution of 0.926 ppm Fe by a filter, which included a micelle (ODTMA)-clay complex and excess sand (100:1, W/W)[a].

| Successive volumes of cyanide solution passing through the filter (liter) | Concentration of Fe in emerging solution (ppm) | Experimental Percent removal |
|---|---|---|
| 3.6 | 0.00926 | 99.0 |
| 7.2 | 0.00688 | 99.26 |
| 10.6 | 0.00358 | 99.61 (99.3) |
| 18 | 0.00403 | 99.56 |
| 25 | 0.0335 | 96.38 |
| 28.6 | 0.0525 | 94.33 (93.1) |
| 53.6 | 0.125 | 86.55 |
| 61.7 | 0.122 | 86.77 |
| 74 | 0.1218 | 86.84 (86.2) |

[a]The filter included 6.5 gr of complex, which amounts to 2 gr of ODTMA. The flow rate was 30 ml/min. The molar concentration of Fe was 1.658E−5. Fe was determined by ICP. The initial cyanide concentration was 2.9 ppm. The values in parenthesis are percent removal of cyanide, which were measured separately.

Release of Surfactants and their Re-Adsorption in Sand/Clay Columns

Release of organic cations from cationic micelle-clay complexes in column-filters for water purification might pose a problem. In (8) we determined the release of ODTMA and BDMHDA from micelle-clay complexes, and devised a method to retain the released cations by using a column filled with sand/clay mixtures. The adsorption of 5 mM ODTMA or BDMHDA on montmorillonite added at 5 g/l clay was complete. The release was examined at different times and complex concentrations. The percents of release of ODTMA after 24 hr were 13.2, 3.8 and 0 for 0.1, 1 and 5 g/L, respectively, whereas for BDMHDA the corresponding values were 31.2, 19.4 and 7.2. Measurements by carbon analysis yielded the amount of the released organic cation from micelle-clay complexes in column-filters for water purification after adding a layer (12 cm) of quartz mixed with clay (150:1 w/w ratio) at the bottom of the column. Measurements of DOC (Dissolved organic carbon) showed that the amount of the released organic cation from columns including the micelle-clay complexes was less (or equal within the experimental error) than the amount released from those including quartz alone or a quartz-clay mixture. Hence, carbon analysis showed that in the ppm range all the released cations (ODTMA or BDMHDA) were retained by the column-filter. The water passing through a 25 cm column filled with quartz mixed with micelle-clay was also passed sequentially through three columns filled with quartz-clay (150:1) and was concentrated 1000-fold. Measurements by GC-MS showed no traces of the organic cations, i.e., below 1 ppb.

The filtration experiment in (8) was limited to passing one liter (about 10 pore volumes) through the filter. The experiment also showed that the release of ODTMA was significantly less than that of BDMHDA, corresponding to the fact that its CMC value is one half of that of BDMHDA. More recently we have extended this experiment. We tested the release of surfactants from the complex in the filter by performing extensive tests, which included consecutive passage of 300 liters (about 2700 pore volumes) through a filter which included a mixture of sand with the micelle-clay complex at 20:1 (w/w) ratio. The flow rate in these experiments was 50 mL/min, which corresponds to a velocity of 2.5 cm/sec, or 1.5 m/h. For the case of BDMHDA The concentration of the released BDMHDA in the fifth liter as measured by GC-MS was 35.5 ppb. The concentration of the surfactant in consecutive volumes passed through the filter was smaller than this value. Hence, we could deduce that the passage of 300 liters resulted in no more than 3% release of BDMHDA from the filter. A passage of the water through a 10 cm layer of sand mixed with montmorillonite at 150:1 (w/w) ratio gave a value of 0.2 ppb for the concentration of surfactant in the emerging water. Measurements by LC-MS gave a value of an order of magnitude smaller.

Similar tests employing ODTMA are still underway, but the release of ODTMA was shown to be significantly smaller than that of BDMHDA (8). At this stage analysis by LC-MS (Finnigan MAT LCQ Ion Trap Mass Spectrometer with an electrospray ionization source coupled to a modular Spectra-system LC with SCM1000 degasser and P4000 LC Pump) gave in the emerging samples peak areas (arbitrary units) between 780 and 1838 compared with 6016 of a calibration curve of aqueous solution of 3.3 ppb ODTMA. Hence, the outcome is that in all cases the emerging concentration of ODTMA was significantly less than 3 ppb.

The conclusion is that the released organic cations from micelle-clay complexes can be completely retained by adding quartz-clay layers.

EXAMPLES

Materials. The clay used was Wyoming Na-montmorillonite SWy-2 obtained from the Source Clays Repository (Clay Minerals Society, Columbia, Mo.). Quartz sand (grain size 0.8-1.5 mm) was purchased from Negev Industrial Minerals (Israel). Octadecyltrimethylammonium bromide (ODTMA) and Cetylpyridinium (CP) were purchased from Sigma-Aldrich (Sigma Chemical Co., St. Louis, Mo.). Benzyldimethyl-hexadecylammonium chloride (BDMHDA) was purchased from Fluka Chemie (Buchs, Switzerland).

Figure 1A:
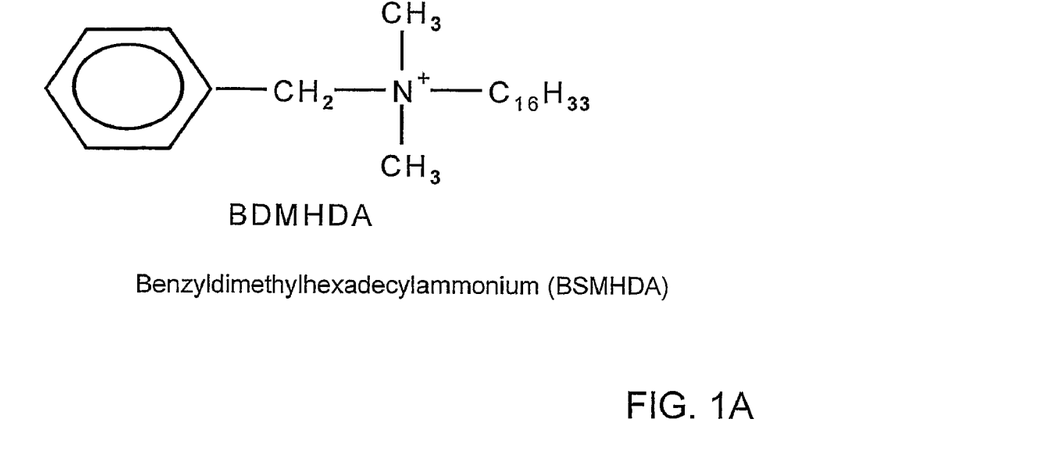
FIGS. 1A-C show the chemical structures of three organic cations forming micelles for capturing inorganic anionic pollutants; (1A) BDMHDA; (1B) ODTMA; (1C) cetylpyridinum bromide.
Figure 1B:
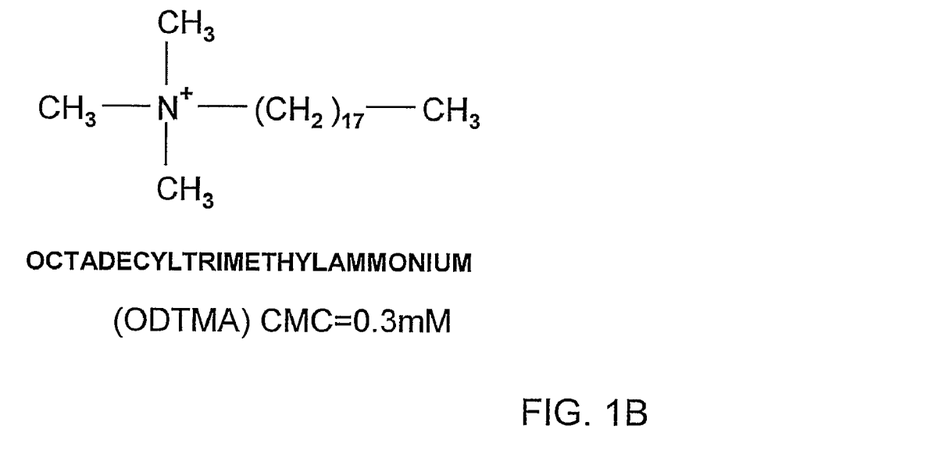
Figure 1C:
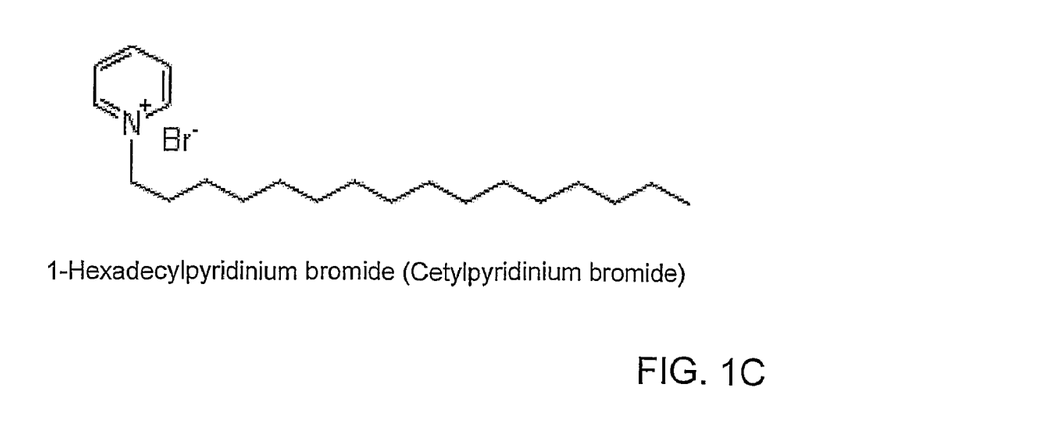

Structural formulae of surfactants are shown on FIG. 1.

Adsorption. ODTMA or BDMHDA were added to the solutions of pollutants. Pollutant-micelle complexes were kept stirring for 72 h. Then 10 ml of micelle-pollutant complexes were mixed in a polypropylene copolymer centrifuge tube with 5 ml of water suspension of montmorillonite. Experiments showed no adsorption of pollutants on the tubes. Concentrations of surfactants in suspensions were 2.5; 5 and 12 mM, i.e., much above their CMC values, which are 0.3 mM and 0.6 mM for ODTMA and BDMHDA, respectively (6, 9). Concentrations of pollutants in suspensions were in the range from 0.05 mg/L to 40 mg/L.

Concentrations of micelle-clay complexes were 2, 5 and 10 g/L. Tubes containing suspensions of pollutants and micelle-clay complexes were kept at 25±1° C. under continuous agitation for 72 h. Then the tubes were centrifuged for 20 min. at 15000 g and supernatants were passed through teflon filters (ISI, Israel) of 0.2 in pore diameter and analyzed.

Column filter experiments were performed with 100/1, 40/1, 19/1 and 10/1 (w/w) mixtures of quartz sand and ODTMA-clay, BDMHDA-clay, or CP-clay complex in a column of 25 cm length and of 5 cm diameter. Quartz sand was thoroughly washed by distilled water and dried at 105° C. for 24 h. The micelle-complex was prepared by stirring 2.5 mM of BDMHDA with 2.5 g/L clay for 72 h. Then suspensions were centrifuged for 20 min. at 10000 g, supernatants were discarded, and the complex was lyophilized.

In a larger scale preparation of the micelle-clay 12 mM of organic cation were added to 10 g/liter clay in a 12 liter container. Drying of the complex could be achieved either by lyophilization, or by a furnace at 45-80 c, or by heating at low pressure. The column (in the case of a 100/1 sand/complex mixture) was filled with 650 g sand mixed with 6.5 g of micelle-clay complex. Non woven polypropylene geo textile filters (Markham Culverts Ltd., Papua New Guinea) were placed on both sides of the column. The column was connected to a peristaltic pump and saturated by distilled water from the bottom (flow rate of 20 to 110 ml/min).

The experiments were performed in duplicate.

Analysis of pollutants. Perchlorate was tested by an ion chromatograph (Dionex) at the laboratory of Israeli Water Commission according to Method EPA-314 with a sensitivity of 2-4 ppb.

GC-MS measurements were performed with Saturn 2000 GC-MS (Varian, Walnut Creek Calif.) equipped with $SPB^{TM-5}$ capillary column, 30 m×0.25 mm i.d.×0.25 μm film thickness from Supelco (Bellefonte, Pa.) The carrier gas was helium (linear velocity was 50 cm/s). Injector temperature was 280° C. The oven temperature was held at 50° C. for 2 min, and then raised at 5° C./min to 260° C. The transfer line temperature was 300° C. Biphenyl was used as internal standard.

Ferum analysis was by ICP, which is also the method of chromate analysis, but chromate analysis of preliminary results was obtained by a UV-Vis spectrophotometer.

Cyanide, ($CN^-$) was determined (at Bactochem Laboratory, Ness-Ziona 74031, Israel) by a colorimetric method, in which NaOH is added to $CN^-$ solution followed by addition of acetate buffer, Chloramine-T and dilute pyridine-barbituric acid.

Adsorption and Convection in a Column Filter.

The adsorption and convection are described by Eq (1) whose numerical solution was executed by a FORTRAN program written by us.

$$dC(X,t)/dt = -v \partial C/\partial X - C_1 \cdot C(X,t) R(X,t) + \alpha \cdot D_1(R_o - R(X,t)) \quad (1)$$

A column of length L is filled with material whose initial molar concentration of adsorbing sites is $R_o$, whose concentration changes later to $R(X,t)$. The beginning and end of the filter are at the coordinates $X=0$ and $X=L$, respectively. We consider that the pollutant concentration at the inlet, $C_o$ is constant i.e., $C(X,t)=C_o$, $X \leq 0$, where t denotes time.

The effect of several parameters on filter efficiency and capacity was studied, e.g., filter length, $R_0$, kinetic parameters, i.e., $C_1$ (rate constant of forward adsorption), $D_1$ (rate constant of desorption), v (flow velocity); $\alpha$ (<1) denotes the degree of hysteresis, which was indeed observed. We have started to determine $R_o$, and, the kinetic parameters $C_1$ and $D_1$ from batch experiments for several cases. Following the analysis we have reached a conclusion that flow velocity in the filter can be increased several-fold and we could give an estimate for filter capacity for very low pollutant concentrations, which will be further tested. In certain cases which were tested fair to good predictions were obtained and the program has been useful in experimental design, including situations (perchlorate) where results in suspension could not be determined accurately.

The invention claimed is:

1. A method for obtaining an aqueous solution substantially free of inorganic anionic pollutants selected from perchlorate, cyanide or chromate present therein, comprising contacting the aqueous solution containing said pollutants with a complex comprising micelles of an organic cation adsorbed on clay for removal of said pollutants from the aqueous solution.

2. A method according to claim 1, wherein the aqueous solution containing said pollutants is contacted with a mixture comprised of (i) a granular material and (ii) the complex comprising micelles of an organic cation adsorbed on clay, said mixture being accommodated in a container adapted for their accomodation.

3. A system for obtaining an aqueous solution substantially free of inorganic anionic pollutants selected from perchlorate, cyanide or chromate present therein, the system comprising at least one container adapted to receive the polluted aqueous solution and containing a mixture of (i) a granular material and (ii) a complex comprising micelles of an organic cation adsorbed on clay.

4. A system according to claim 3, wherein the container is a column.

5. A system according to claim 3, wherein said container further comprises an additional layer at its bottom having a layer being about 7-10% of the total volume of the container, said layer comprising sand or a mixture of sand and clay.

6. A system according to claim 3, comprising two or more containers.

7. A system according to claim 6, wherein at least one container comprises a plurality of alternating, first and second layers, said first layer comprises sand or sand and clay and said second layer comprises a mixture of (i) a granular material and (ii) a complex comprising micelles of an organic cation adsorbed on clay.

8. A method according to claim 1, comprising adding into the polluted water either (i) micelles of an organic cation and particulate clay, to yield a complex, or (ii) a complex of micelles of an organic cation and particulate clay.

9. A method according to claim 8, wherein the particulate clay is added to the water after the addition of said micelles.

10. A method according to claim 9, comprising an incubation step prior to addition of the particulate clay.

11. A method according to claim 8, comprising allowing sedimentation of said complex and removing the sediment.

* * * * *